C12) United States Patent
Inagaki et al.

(10) Patent No.: US 7,496,923 B2
(45) Date of Patent: *Feb. 24, 2009

(54) METHOD AND DEVICE TO PROCESS MULTIDIMENSIONAL ARRAY OBJECTS

(75) Inventors: Tatsushi Inagaki, Machida (JP);
Hideaki Komatsu, Yokohama (JP);
Akira Koseki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 842 days.

This patent is subject to a terminal disclaimer.

(21) Appl. No.: 11/116,594

(22) Filed: Apr. 28, 2005

(65) Prior Publication Data

US 2005/0188379 A1    Aug. 25, 2005

Related U.S. Application Data

(63) Continuation of application No. 09/490,582, filed on Jan. 25, 2000, now Pat. No. 6,973,648.

(30) Foreign Application Priority Data

Jan. 27, 1999    (JP)    ................. 11-017943

(51) Int. Cl.
*G06F 9/46*    (2006.01)
(52) U.S. Cl. .............. 719/312; 717/148; 717/151; 717/153; 711/111; 711/114; 711/154
(58) Field of Classification Search .......... 719/312; 717/148, 151, 153; 711/111, 114, 154
See application file for complete search history.

(56) References Cited

U.S. PATENT DOCUMENTS

| 5,212,663 | A | | 5/1993 | Leong |
| 5,214,599 | A | | 5/1993 | Magerman |
| 5,644,709 | A | * | 7/1997 | Austin .................. 714/53 |
| 5,668,751 | A | | 9/1997 | Sher et al. |
| 5,835,701 | A | | 11/1998 | Hastings |
| 6,115,782 | A | | 9/2000 | Wolczko et al. |
| 6,374,286 | B1 | | 4/2002 | Gee et al. |

(Continued)

FOREIGN PATENT DOCUMENTS

JP    02-116960    5/1990

OTHER PUBLICATIONS

Cierniak, "Briki: an Optimizing Java Compiler", 1997, 1063-6390/97, pp. 179-184.*

(Continued)

*Primary Examiner*—Thomas Lee
*Assistant Examiner*—Phuong N Hoang
(74) *Attorney, Agent, or Firm*—Owen J. Gamon; Roy W. Truelson

(57) ABSTRACT

A method for processing a multidimensional array object in which a multidimensional array is implemented by an array of array objects. The multidimensional array object comprises array objects which constitute the multidimensional array. Flags representing that it is possible to optimize a process for elements of the multidimensional array object are added as additional information. The flags are stored in a storage device (main memory for instance). Then, a machine code corresponding to a state of the flags is executed.

10 Claims, 8 Drawing Sheets

U.S. PATENT DOCUMENTS 6,412,107 B1 * 6/2002 Cyran et al. ................. 717/148
6,532,531 B1 3/2003 O'Connor et al.

OTHER PUBLICATIONS

Hardwick, "Tuning FFTW for Win32 Compiler", Sep. 1998, pp. 1-15.

Prashant, Synchronizing a sound stream, no date, pp. 1-2.

Goedecker, "Matrix-Vector Multiplication", Nov. 1998, pp. 1-3.

Ciernak, "Briki: an Optimizing Java Compiler", 1997, IEEE, pp. 179-184.

Sibley, "A definition optimization technique used in a code translation algorithm", Jan. 1989, ACM, vol. 32, pp. 94-105.

* cited by examiner

METHOD AND DEVICE TO PROCESS MULTIDIMENSIONAL ARRAY OBJECTS

CROSS REFERENCE TO RELATED APPLICATION

This is a continuation of U.S. patent application Ser. No. 09/490,582, filed Jan. 25, 2000, entitled "Method and Device to Process Multidimensional Array Objects", now U.S. Pat. No. 6,973,648, which is herein incorporated by reference.

FIELD OF THE INVENTION

The present invention relates to a method and a device for processing a multidimensional array object in a language in which a multidimensional array is implemented by an array of array objects.

BACKGROUND

Processing speed can be dramatically improved by paralleling and vectorizing a process for elements of a multidimensional array. In particular, in a processor with multiple execution units such as IA64 or PowerPC, an effect of improved processing speed by such optimizations is remarkable. In order to perform such optimizations, it is necessary to analyze dependency among processes of multidimensional array elements and locations of array elements. However, in a language like Java which implements a multidimensional array by means of an array of array objects, it is difficult to perform such analyses since element configuration of a multidimensional array may change at an execution time.

Conventionally, there were roughly two solutions to this problem. First, there is a known method of performing an analysis by scanning addresses of multidimensional array elements accessed by a certain process at an execution time. There is also a known method of implementing a multidimensional array without any change in element configuration at an execution time by means of extension of language specifications or installation of a unique library. It certainly becomes possible to optimize a process for a multidimensional array by using these methods. However, there were following various problems in these methods.

First, as to the former method, in addition to taking too much time for scanning addresses, there was a problem of having to stop a garbage collector from the time the address scanning is started until processing of an array ends. In particular, the problem of the time for address scanning is fatal for Java in which processing by Just-in-Time compiler is becoming general, so it is not a realistic solution.

On the other hand, as to the latter method, it is proposed by Sun Microsystems Inc. to use a class to access, as a multidimensional array, an area to which memory is allocated as a one-dimensional array. It first provides a class as follows.

```
final class FloatMatrix2D {
    private final float m;
    private final int cols;
    public FloatMatrix2D(int c, int r)
    {
        cols=c;
        m=new float c*r ;
    }
    public float get(int c, int r)
    {
        return m cols*r+c ;
    }
}
```

Here, it is a method wherein, by using method in-lining and operator overloading, an expression described as,

```
FloatMatrix2D f=new FloatMatrix2D(cols, rows)
f[i1,j1 =f[i2,j2 +4;
is handled as follows,
f[i1,j1 =f[i2,j2 +4;

T=f.get(i2,j2)+4;
f.put(i1,j1,T);

T=f cols*j2+i2 +4;
f cols*j1+i1 =T;
```

By using such a method, it is possible to directly access elements without undergoing reference to any object array. In addition, it is not necessary to check an index as required when referring to an object array. In this method, however, there is a problem that application of an analysis required for parallelization or optimization becomes difficult.

Namely, in the above method, as there is no information in the source rendered into bytecode, it is not possible to perform any more analysis of dependency among array accesses than an analysis in an index converted to one dimension. Accordingly, it becomes very difficult to detect parallelism taking multidimensionality into consideration, so application of parallelization cannot be expected in many cases.

For instance,

```
for j
    for i
        f[i,j =f[2*i−1,j ;
``` in a program as above, since it can easily be analyzed as having no dependency in the direction of j, great parallelism can be obtained by skewing the innermost loop in the direction of j or unrolling the loop in the direction of j. However, if the bytecode is converted to f cols*j+i=f cols*j+2*i−1 it becomes necessary to seek if there is an integer solution in cols*j1+i1=cols*j2+2*i2−1 and decide whether there is any dependency as to the direction of j. This means that a simple analytic problem has become an NP complete problem. Also in general, it is thinkable that a problem becomes more difficult to solve if multidimensional information reduces to one dimension, and thus the method of Sun Microsystems Inc. is not a method suited to dependency analysis for parallelization.

There is also another method to allow dependency analysis by modifying or extending language specifications. For instance, a method as in Fortran wherein a multidimensional array is introduced to a language is thinkable. Or even in the above-mentioned method wherein an array is simply one-dimensionalized, dependency analysis should be made possible by adding extended specifications as follows. Namely, in the following expression used in the preceding example, f cols*j+i=f cols*j+2*i−1 if language specifications are extended so that a compiler may take advantage of the array being two-dimensional and f.cols being the number of columns, comparison of indexes can be multidimensionally developed so as to facilitate an analysis.

For instance, in this example, the problem can be replaced with the following,
an analysis of (cols*j+i)div cols
and (cols*j+2*i−1)div cols
an analysis of (cols*j+i)mod cols
and (cols*j+2*i−1)mod cols
so it can easily be analyzed as having parallelism in the direction of j. However, costs for such modifications and extensions of specifications are very high. With respect to Java in particular, in consideration of the present circumstances where Java is spreading worldwide, it is not easy to effectively extend its specifications by addition of a new array object or by dependence on a specific library.

In addition, while a method to analyze an expression tree of an arithmetic expression without extending language specifications is also thinkable, it has a problem that an analysis becomes difficult when the expression tree is transformed due to deletion of a common subexpression and so on in addition to requirement of support to specify the dimensional.

SUMMARY

An object of the present invention is to resolve the above-mentioned subject and provide a method and a device for processing a multidimensional array object which allows improved speed of processing a multidimensional array without any modification of specifications.

The present invention covers a method for processing a multidimensional array object in a language in which a multidimensional array is implemented by an array of array objects. And to a multidimensional array object comprising array objects which constitute the multidimensional array, flags representing that it is possible to optimize a process for elements of the multidimensional array object are added as additional information. The flags are stored in a storage device (main memory for instance). Then, a machine code corresponding to a state of the flags is executed.

The present invention introduces flags representing that it is possible to optimize a process for elements of a multidimensional array object and monitors modifications of element configuration of a multidimensional array, and at the same time, assures that a process optimized for an array to which these flags are set may be executed. Thus, it becomes possible, without any modification of specifications, to determine at high speed a possibility of optimizing a process for a multidimensional array and process a multidimensional array whose process optimization is determined to be possible with an optimized code so as to improve execution speed of a program. Consequently, it becomes possible to speed up a process of a multidimensional array implemented by an array of array objects, which was conventionally difficult.

DETAILED DESCRIPTION

In a language like Java covered by the present invention, a multidimensional array is implemented by an array of array objects. As contents of such an object array (an array of array objects) may be freely rewritten, there is a possibility that element configuration of a multidimensional array may change at an execution time. Accordingly, it is very difficult to determine whether it is possible to optimize a process for each element of a multidimensional array. On the other hand, in reality, many multidimensional arrays are generated with element configuration which allows optimization, and it seldom happens that a possibility of optimizing the process is destroyed by rewriting of an object array. Thus, in many cases, there are circumstances where it is possible to optimize the process of a multidimensional array but optimization cannot be performed. In the present invention, on the above precondition, flags representing that it is possible to optimize a process for elements of a multidimensional array object are added as additional information to a multidimensional array object comprising array objects which constitute the multidimensional array, and executes a machine code corresponding to a state of the flags.

As a preferred embodiment, a machine code corresponding to a state of the flags may either be dynamically generated at an execution time or provided in advance. Moreover, the flags are configured so as to be inverted if a predetermined condition is no longer met. This predetermined condition means, for instance, that a base array of a multidimensional array object is allocated to consecutive memory areas. In addition, as a preferred embodiment, a machine code of a portion for processing a multidimensional array object is either a machine code optimized or a machine code not optimized according to the predetermined condition corresponding to a state of the flags. Furthermore, it is determined whether or not the predetermined condition is met when writing to the multidimensional array object so that the flags are configured to be inverted if the predetermined condition is not met. On the other hand, if the predetermined condition is met when generating the multidimensional array object, it is configured so that the flags are set to a generated multidimensional array object.

As a probability in a language like Java, in the case that there is a possibility of multi-thread processing of a multidimensional array object, a machine code for storing on a stack a dummy reference to the multidimensional array during execution of an optimization code is generated so as to prevent collection by a garbage collector.

Next, an example of implementing the method for processing a multidimensional array object of the present invention in Java Just-in-Time compiler is explained.

Figure 4:
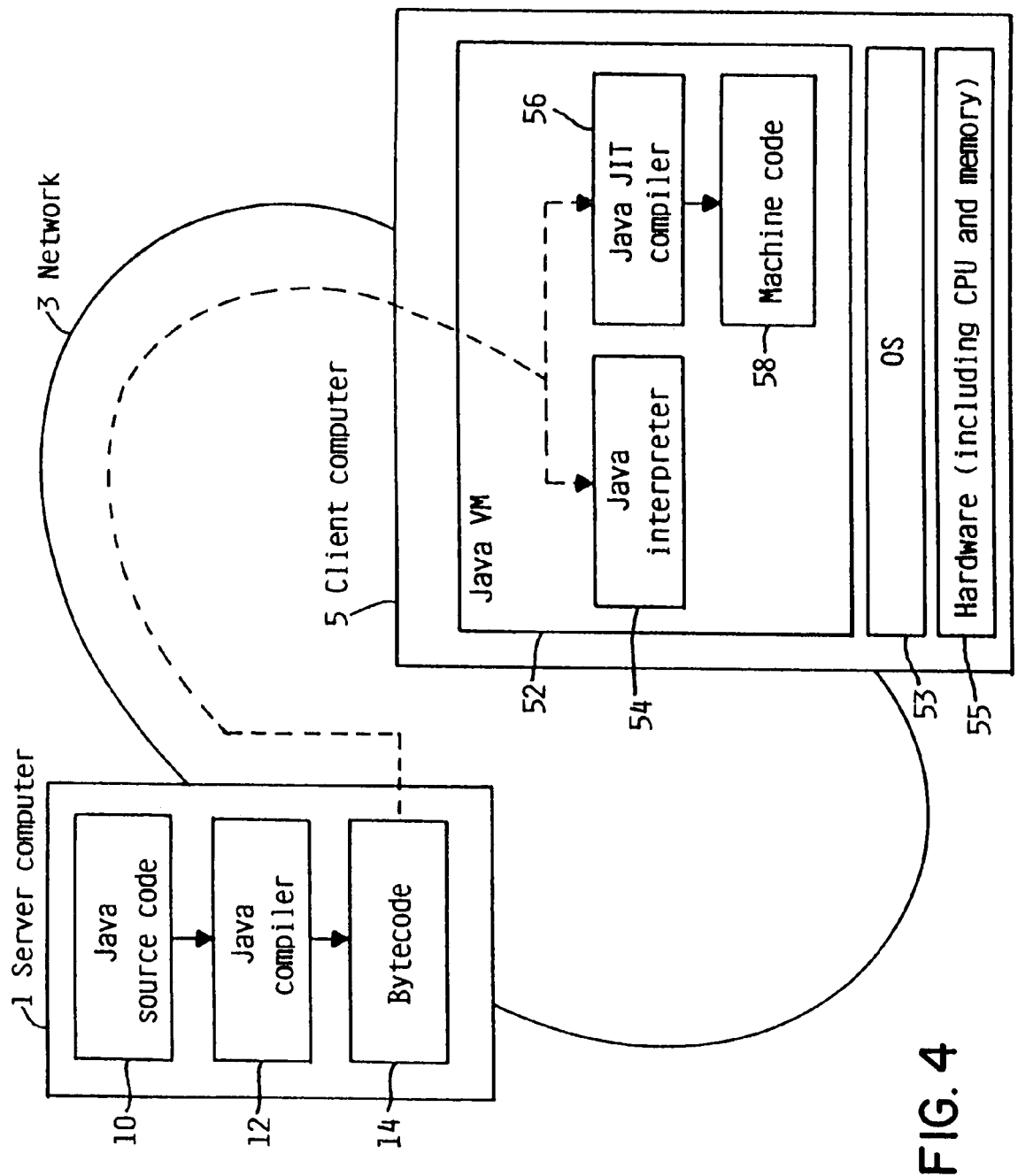
FIG. 4 is an overview of the entire system of the present invention.

First, device configuration of the present invention in an environment using Java is described by using FIG. 4. Server computer 1 and client computer 5 are connected via network 3. Client computer 5 comprises Java VM (virtual machine) 52, OS (operating system) 53 and hardware (including CPU and memory) 55. Moreover, Java VM 52 comprises Java interpreter 54 or Java JIT compiler 56. It may also comprise both interpreter 54 and JIT compiler 56. Meanwhile, client computer 5 may be, other than an ordinary computer, a so-called network computer or a home information appliance which has smaller size of memory or does not include any auxiliary storage such as a hard disk.

On server computer 1, Java source code 10 is compiled by Java compiler 12. The result of this compilation is bytecode 14. This bytecode 14 is sent to client computer 5 via network 3. Bytecode 14 is a native code for Java Virtual Machine (Java VM) 52 installed on a WWW browser (World Wide Web Browser) in client computer 5, etc., and Java interpreter 54 or Java JIT compiler 56 is used when actually executed on the CPU of hardware 55. Interpreter 54 decodes bytecode 14 at an execution time, and invokes and executes a processing routine prepared for each instruction. On the other hand, JIT compiler 56 converts a bytecode to machine code 58 by using a compiler in advance or immediately before execution and then executes it on the CPU.

Figure 1:
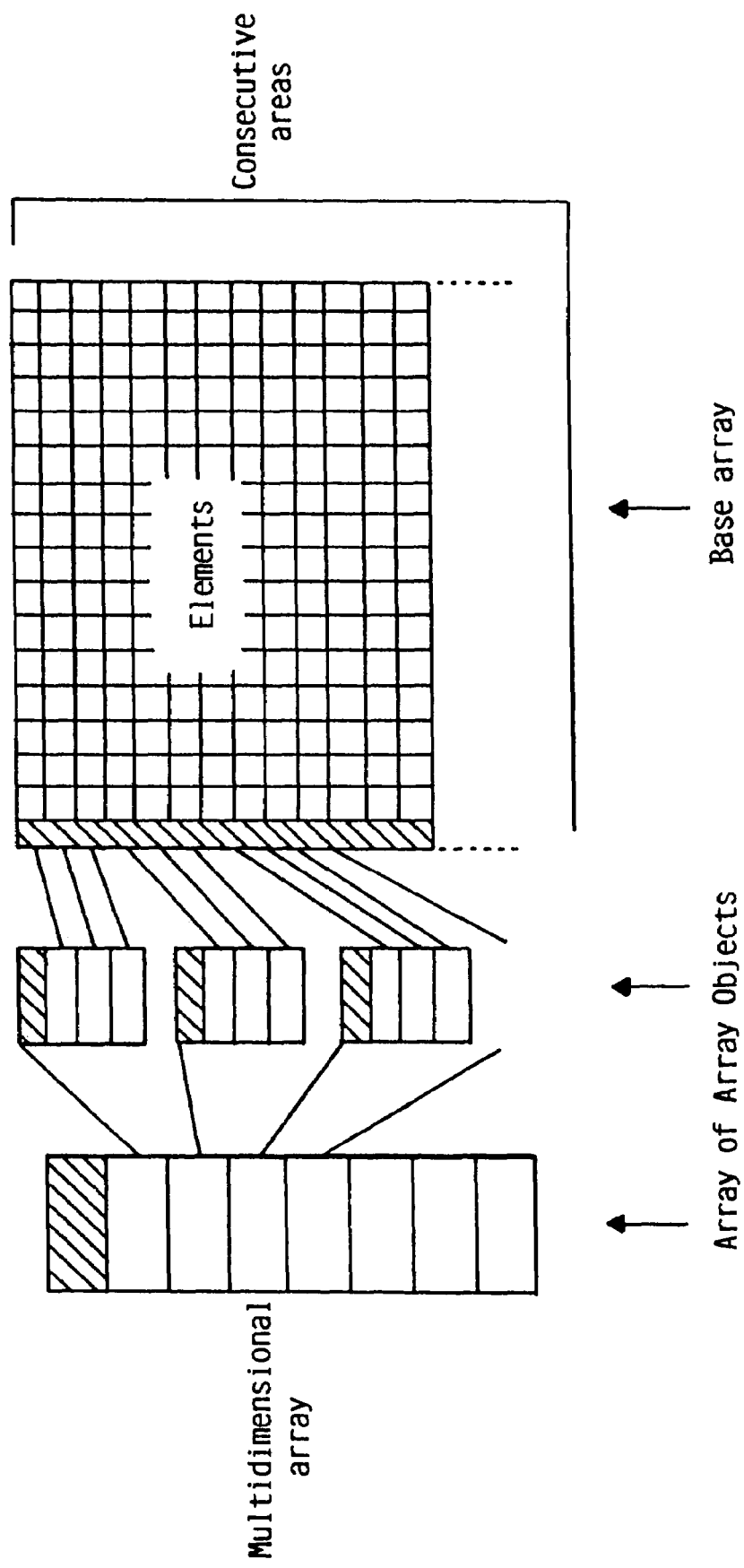
FIG. 1 is a drawing for explaining an example of multidimensional array objects in the present invention.

JIT compiler 56 implements a method for processing a multidimensional array object described in detail as follows. Here, a condition to allow optimization of a process for elements of a multidimensional array object is that an array of the lowest dimension in which elements of a multidimensional array object are stored (hereafter, a base array) is allocated to consecutive memory areas. FIG. 1 shows an example of it. Placement of elements of a multidimensional array object is kept in such a state so that a dependency analysis among processes accessing the elements becomes possible. In this embodiment, a multidimensional array is generated so that a base array may be consecutively placed when multianewarray instruction of Java bytecode is executed, and thereafter, implementation is performed to drop the flags when writing occurs to array objects which constitute the multidimensional array (see FIG. 1) by aastore instruction. The concrete process regarding the above is shown in 1.1 to 1.2. In addition, since a process is executed in multi-thread in Java, special measures taking it into consideration are required. This is referred to in 1.3. While 1.2 describes a procedure for processing, a machine code corresponding to the processing is generated for implementation. Lastly, reduction of execution time when a process is added to aastore is discussed in 1.4.

Figure 5:
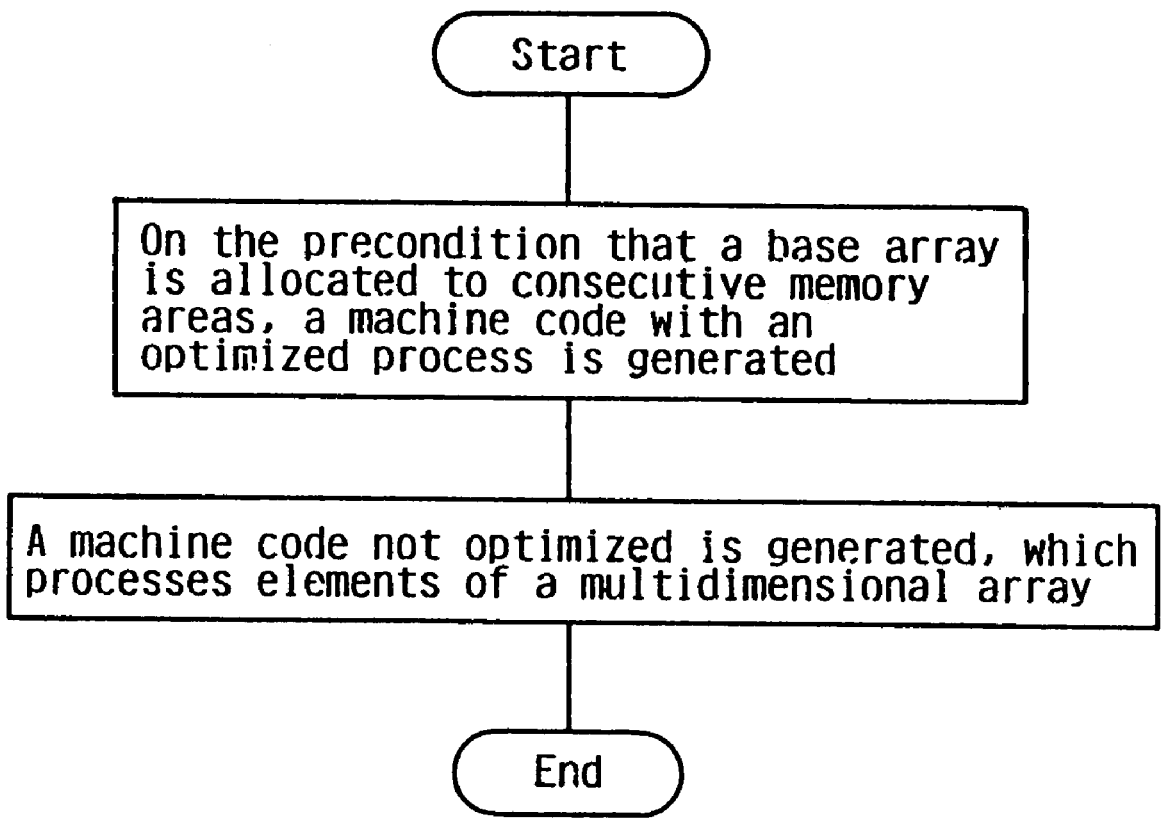
FIG. 5 is a flowchart showing an example of processes at a compilation time in the present invention.

1.1: Processing at a Compilation Time (FIG. 5)

The condition to allow optimization of a process for elements of a multidimensional array object is that a base array of a multidimensional array is allocated to consecutive memory areas.

1. On the precondition that the base array is allocated to consecutive memory areas, a machine code with an optimized process is generated.

2. A machine code not optimized is generated, which processes elements of a multidimensional array object.

Figure 6:
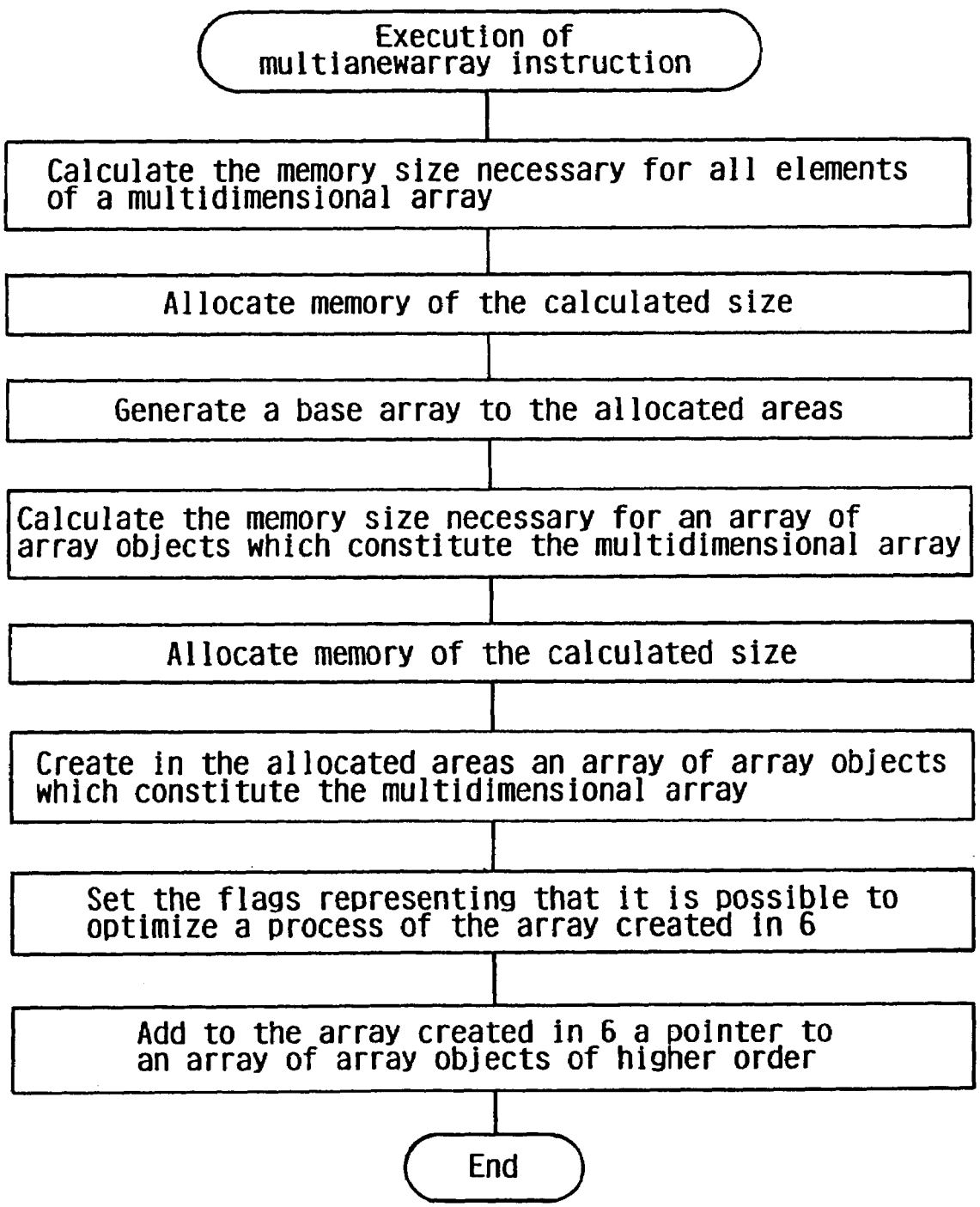
FIG. 6 is a flowchart showing an example of processes when generating a multidimensional array in the present invention.

1.2: Processing at an Execution Time (FIG. 6)

1.2.1: Processing when Generating a Multidimensional Array

The following process is performed when multianewarray instruction is executed.

1. Calculate the memory size necessary for all elements of a multidimensional array object.

2. Allocate memory of the calculated size.

3. Generate a base array to the allocated areas.

4. Calculate the memory size necessary for an array of array objects which constitute the multidimensional array.

5. Allocate memory of the calculated size.

6. Create in the allocated areas an array of array objects which constitute the multidimensional array.

7. Set the flags representing that it is possible to optimize a process of the array created in 6.

Figure 2:
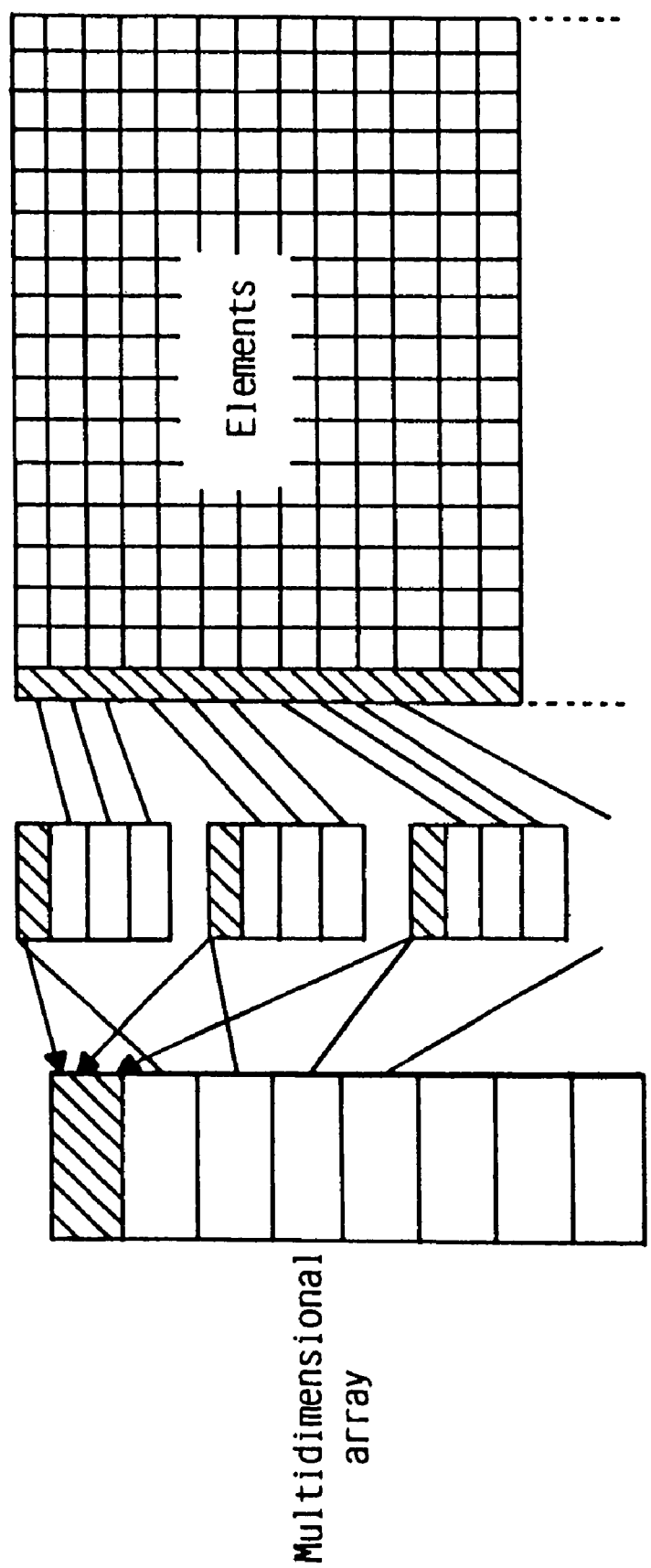
FIG. 2 is a drawing for explaining an example of pointers in multidimensional array objects of the present invention.

8. Add to the array created in 6 a pointer to an array of array objects of higher order. FIG. 2 shows an example of it.

Figure 7:
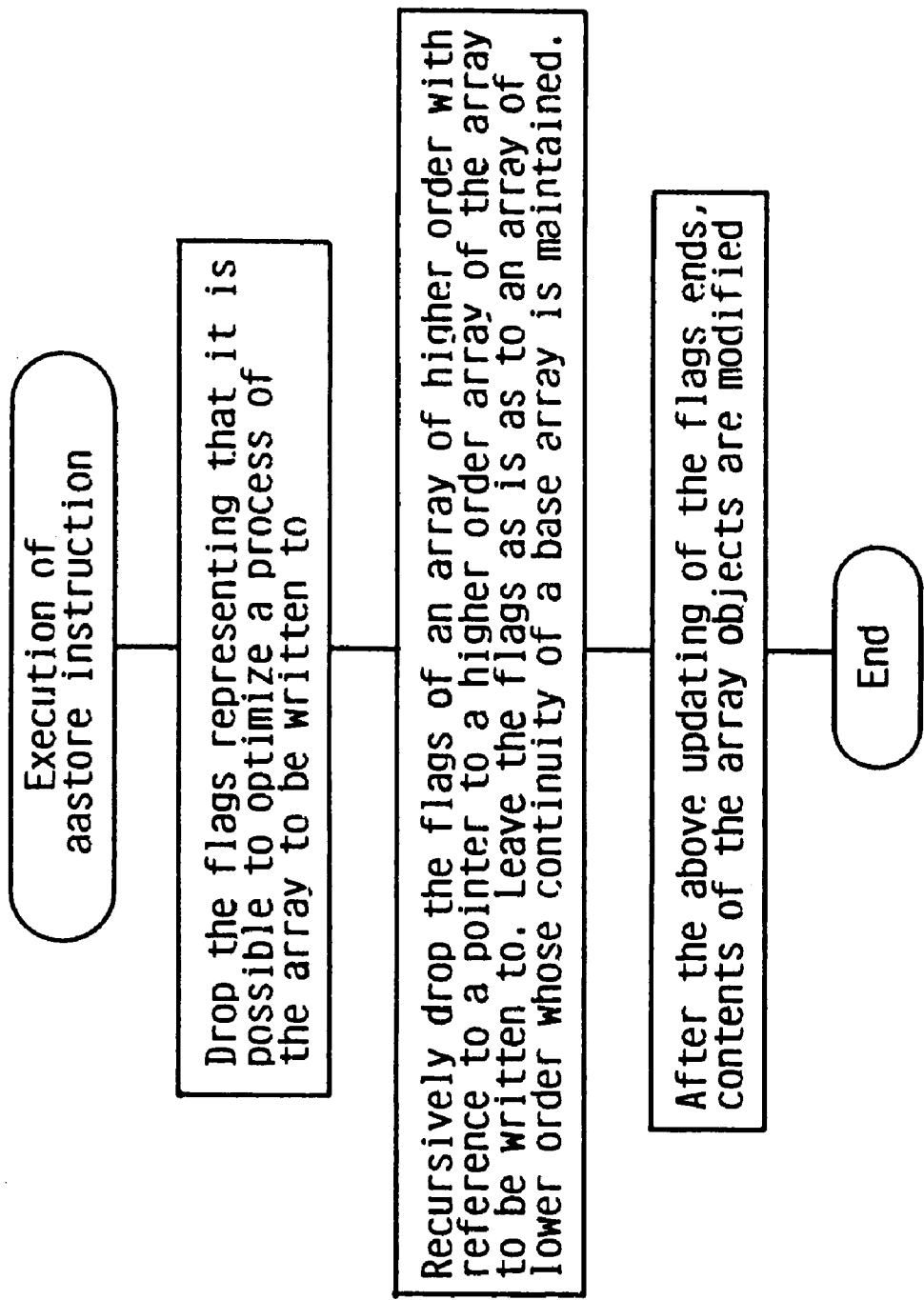
FIG. 7 is a flowchart showing an example of processes when writing to array objects which constitute a multidimensional array in the present invention.

1.2.2: Processing when Writing to Array Objects which Constitute a Multidimensional Array (FIG. 7)

The following process is performed when aastore instruction is executed.

1. Drop the flags representing that it is possible to optimize a process of the array to be written to.

Figure 3:
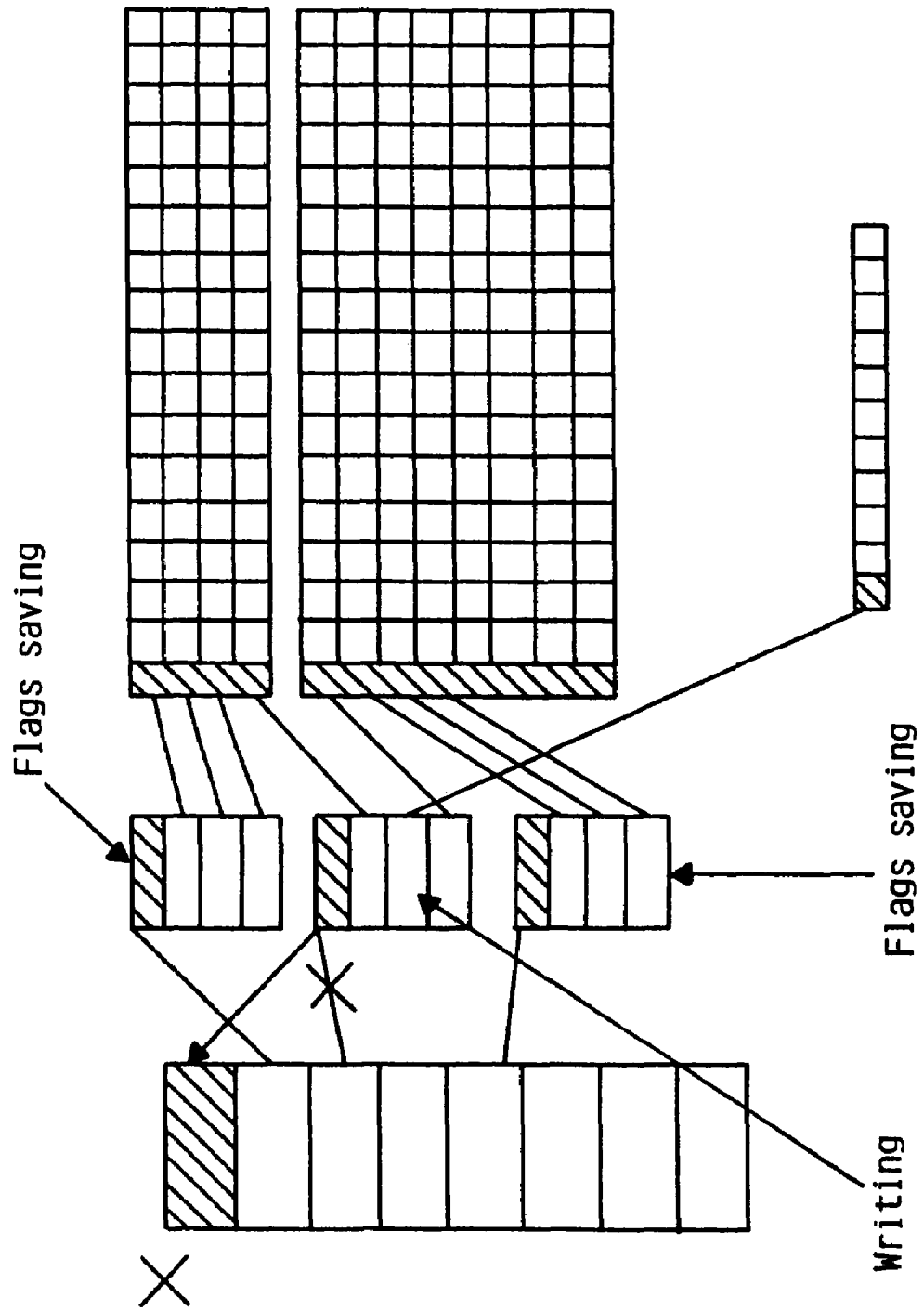
FIG. 3 is a drawing for explaining an example of handling of flags representing that it is possible to optimize a process at a writing time in multidimensional array objects of the present invention.

2. Recursively drop the flags of an array of higher order with reference to a pointer to a higher order array of the array to be written to. Leave the flags as is as to an array of lower order whose continuity of a base array is maintained. FIG. 3 shows an example of it.

3. After the above updating of the flags ends, contents of the array objects are modified.

Figure 8:
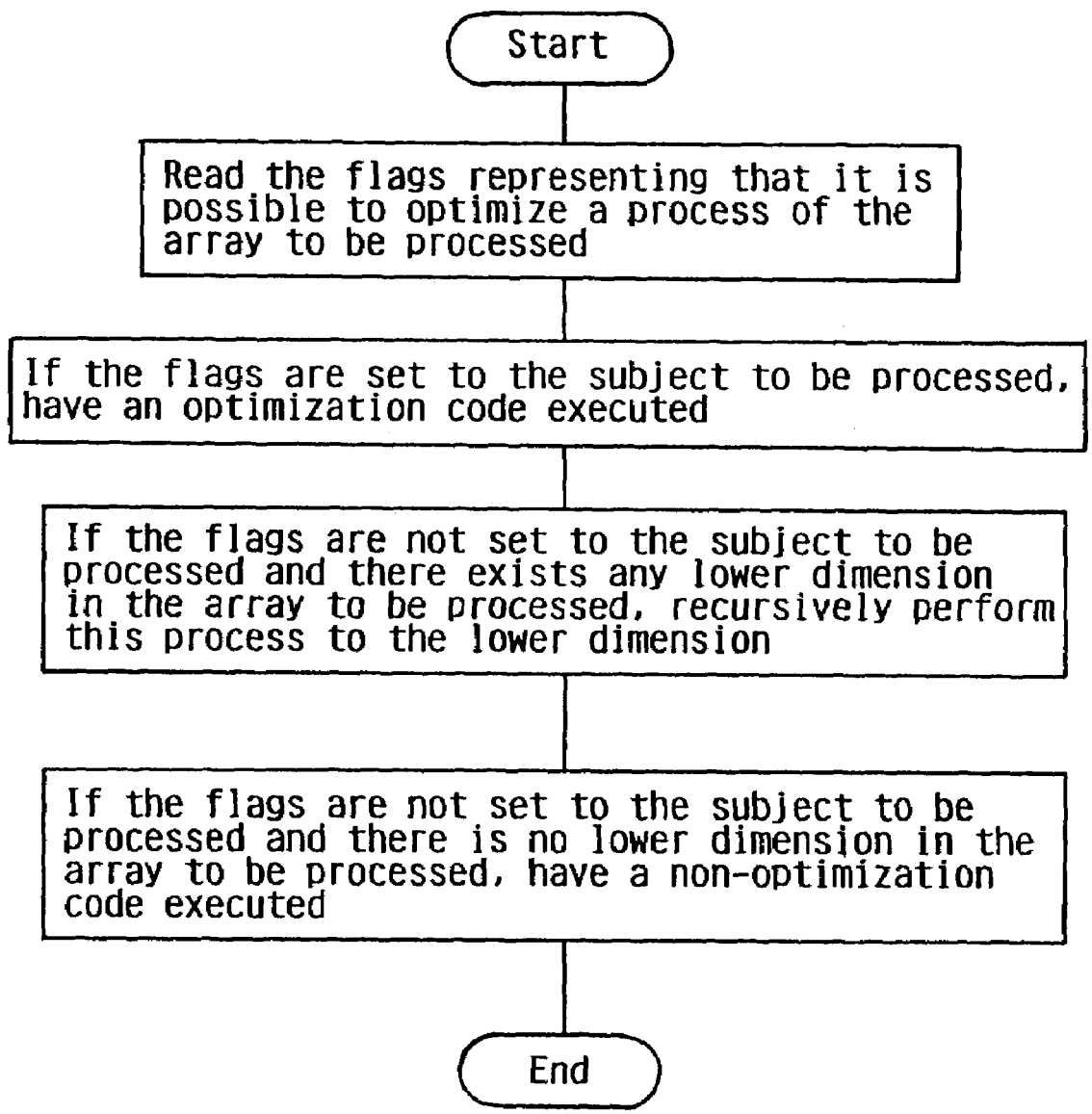
FIG. 8 is a flowchart showing an example of processes when accessing a multidimensional array in the present invention.

1.2,3: Processing when Accessing a Multidimensional Array (FIG. 8)

1. Read the flags representing that it is possible to optimize a process of the array to be processed.

2. If the flags are set to the subject to be processed, have an optimization code executed.

3. If the flags are not set to the subject to be processed and there exists any lower dimension in the array to be processed, recursively perform this process to the lower dimension.

4. If the flags are not set to the subject to be processed and there is no lower dimension in the array to be processed, have a non-optimization code executed.

1.2.3.1: Concrete Example

The following shows a concrete example of a multidimensional array access.

```
....
xA 100 100 =1.0;
....
for i= 0 to 100
    for K= 0 to 100
        vB i =vB i +xA k i *vB i
```

In this example, as xA 100 100 is accessed preceding a loop, there is essentially no exception occurring to the access to xA in the loop. However, as there is a possibility of rewriting a multidimensional array by aastore, in such an example, it is necessary to check an index range for every access to xA k i in the innermost loop unless all xA 0, xA 1, . . . , xA 100 are privatalized (copied to local of a thread). On the other hand, use of the present invention improves this code as follows.

```
....
xA 100 100 =1.0;
....
for i= 0 to 100
    if(IsOptimizable(xA)) {
        for k= 0 to 100
            vB i =vB i +xA k i *vB i;      //Generate a code without
                                            any range check
    } else {
        for k= 0 to 100
            vB i =vB i +xA k i *vB i;      // Generate a code with
                                            a range check
}
```

The above optimization eliminates conditional branching from the innermost loop and significantly reduces execution time.

1.3: Support for Multi-Thread Processing

In a multi-thread environment, there is a possibility that multiple processes perform reading/writing in parallel to the flags representing that it is possible to optimize a process of the same multidimensional array. For a system using the present invention to properly operate, support in case such an access occurs becomes necessary. The following shows concrete measures.

1.3.1: Assurance of Consistency between a Flagged Array and an Actually Accessed Array If an address storing array elements is acquired and flags are read in separate cycles, there is a possibility that another process may rewrite these values between the two cycles. In this case, since contents of flags representing that it is possible to optimize a process and an array for which a possibility of optimizing a process is designated by the flags do not match, a system utilizing the present invention may violate the language specifications of Java. This problem can generally be solved by rendering these scans into critical sections, while here, a nature property to this embodiment is used and the problem is solved in the following method.

1. When entering in an optimization routine, reading is performed in order of element addresses of an accessed array to flags. In this embodiment, flags change only once from a state of being on to a state of not being on. Accordingly, if flags are on at a reading time, it can be assured that contents of the flags and what is designated by them certainly match. Moreover, if flags are not on, no problem arises since any code accessing the array is a code not optimized.

(A Concrete Example)

```
....
for i= 0 to 100
    if(IsOptimizable(xA)) {
        /*Optimization routine*/
        for k = 0 to 100
            vB i =vB i +xA k i *vB i ;//No range check
    } else
....
```

For instance, in the aforementioned innermost loop, a machine language wherein xA accesses are all performed by using relative addresses from a starting address of a base array is generated. If reading is performed in order of flags to a starting address, in the case that an interrupt by aastore (such as xA 1=null;) occurs during the two readings, the language specifications of Java is violated. On the other hand, if reading is performed in order of an address to flags, there is not such a problem.

2. Writing is performed in order of flags to element addresses of an accessed array. If scanning is performed in this order, the language specifications is not violated even when an optimization code starts operating during writing of the flags and address changes.

3. In a multidimensional array which is three-dimensional or more, writing of flags is hierarchically performed. Here, in order to retain the language specifications of Java, writing of flags is performed in order of higher to lower dimensions.

(A Concrete Example)

For instance, if flags are dropped in order of lower to higher dimensions, an optimization code of a higher dimension may be started during this process. If this code is one that does not check flags of an array of a lower dimension (such as the above code), there is a danger that the language specifications of Java may be violated.

1.3.2: Control of a Garbage Collector

If a process A is calculating element addresses for a multidimensional array possible to optimize a process by utilizing continuity of a base array and not using an object array, there is a possibility that another process B may modify an array of array objects which constitute the multidimensional array during the process of the array. In the specifications of Java, if these operations are invoked in an asynchronous method, process A may perform a process assuming continuity of a base array. However, there is a possibility that a part of the base array is referred to from nowhere due to change of an object array by process B and the array elements to be processed are collected by a garbage collector during processing of process A. To cope with this problem, in this embodiment, collection by a garbage collector is prevented by generating a machine code for storing on a stack a dummy reference to the array during processing by an optimization code.

1.4: Discussion of a Side Effect Caused by a Process Added to aastore.

An example of a program

```
public void sortObj(Obj[]obj){
    for(int i=0;i<obj.length;i++)
        for(int j=i;j<obj.length;j++)
            if(obj[i].data >= obj[j].data){
                Obj tmp = obj[i];
                obj[i] = obj[i];
                obj[j] = tmp;
            }
}
```

Bytecode for the innermost loop

Label1:

```
aload 1 <obj[]>
iload 2 <i>
aaload <obj[i]>
getfield <dat>
aload 1 <obj[]>
iload 3 <j>
aaload <obj[j]>
getfield <dat>
if_icmplt Label2:
aload 1 <obj[]>
iload 2 <i>
aaload <obj[i]>
aastore 4 <tmp>
aload 1 <obj[]>
iload 2 <i>
aload 1 <obj[]>
iload 3 <j>
aaload <obj[j]>
aastore <obj[i] = obj[j]>
aload 1 <obj>
iload 3 <j>
aload 4 <tmp>
aastore <obj[j] = tmp>
```

Label2:

```
        iinc 3 1 <j++>
        aload 1 <obj>
        arraylength <obj.length>
        if_icmplt Label1:
```

Since flags representing that it is possible to optimize a process cannot be set when this array is generated, it is also possible to determine flags outside a loop and perform a versioning for a loop with contents of these flags. Meanwhile, "with a side effect" in this case means to implement a process related to the present invention at an execution time of aastore instruction, and "without a side effect" means only to execute simple aastore instruction.

```
if( IsNotOptimizable(obj)){
    for(int i=0;i<obj.length;i++){
        for(int j=i;j<obj.length;j++){
            if(obj[i].data >= obj[j].data){
                Obj tmp = obj[i];
                obj[i] = obj[j];        //generate aastore
                                        without a side effect
                obj[j] = tmp;           //generate aastore
                                        without a side effect
            }
        }
    }
} else {
    for(int i=0;i<obj.length;i++){
        for(int j=i;j<obj.length;j++){
            if(obj[i].data >= obj[j].data){
                Obj tmp = obj[i];
                obj[i] = obj[j];        //generate aastore
                                        with a side effect
                obj[j] = tmp;           //generate aastore
                                        with a side effect
            }
        }
    }
}
```

It should be noted that the condition of the first if sentence is IsNotOptimizable(obj). Namely, in the case of a program which cannot be optimized, it is not necessary to implement any process related to the present invention for aastore, while in the case that it can be optimized, a process related to the present invention is implemented for aastore (from the else sentence on).

As it is clear from the above discussion, the present invention introduces flags representing that it is possible to optimize a process for elements of a multidimensional array object and monitors modifications of element configuration of a multi-dimensional array, and at the same time, assures that a code optimized for an array to which these flags are set may be executed, and thus, it becomes possible, without any modification of specifications, to determine at high speed a possibility of optimizing a process for a multidimensional array and process a multidimensional array whose process optimization is determined to be possible with an optimized code so as to improve execution speed of a program. Consequently, it becomes possible to speed up a process of a multidimensional array implemented by an array of array objects in Java and so on, which was conventionally difficult.

What is claimed is:

1. A method for processing a multidimensional array object comprising array objects, said multidimensional array object and said array objects being digital data objects storable in addressable data storage locations of a computer, said method comprising the steps of:
   managing flags for said multidimensional array object at execution time of a process for elements of said multidimensional array object, said flags being dynamically alterable at execution time to represent whether it is possible to optimize said process for elements of said multidimensional array object according to a current execution state of said process, said process being a defined set of instructions executable by said computer;
   executing a machine code performing said process, said machine code being selected from among a plurality of machine codes performing said process according to a state of said flags; and
   inverting said flags when a predetermined condition is no longer met; wherein said predetermined condition is whether a base array of a multidimensional array object is allocated to consecutive memory areas; and wherein the machine code is either a machine code optimized or a machine code not optimized according to the predetermined condition.

2. The method of claim 1, further comprising:
   determining whether said predetermined condition is met when writing to said multidimensional array object.

3. The method of claim 1 wherein, further comprising:
   if said predetermined condition is met when generating said multidimensional array object, setting said flags to a generated multidimensional array object.

4. A method for processing a multidimensional array object comprising array objects, said multidimensional array object and said array objects being digital data objects storable in addressable data storage locations of a computer, said method comprising the steps of:
   managing flags for said multidimensional array object at execution time of a process for elements of said multidimensional array object, said flags being dynamically alterable at execution time to represent whether it is possible to optimize said process for elements of said multidimensional array object according to a current execution state of said process, said process being a defined set of instructions executable by said computer;
   executing a machine code performing said process, said machine code being selected from among a plurality of machine codes performing said process according to a state of said flags; and
   inverting said flags when a predetermined condition is no longer met; wherein said predetermined condition is whether a base array of a multidimensional array object is allocated to consecutive memory areas; and wherein the machine code is either a machine code optimized or a machine code not optimized according to the predetermined condition.

5. The storage medium of claim 4, further comprising:
   determining whether said predetermined condition is met when writing to said multidimensional array object.

6. The storage medium of claim 4, further comprising:
   if said predetermined condition is met when generating said multidimensional array object, setting said flags to a generated multidimensional array object.

7. The storage medium of claim 4, further comprising:
   if there is possibility of multi-thread processing of said multidimensional array object, generating a machine code for storing on a stack a dummy reference to said multidimensional array during execution of an optimization code.

8. A computer for processing a multidimensional array object comprising array objects, said multidimensional array object and said array objects being digital data objects storable in addressable data storage locations of said computer, said computer comprising:

a central processing unit; and a program, when read and executed by said central processing unit, comprises steps of:

managing flags for said multidimensional array object at execution time of a process for elements of said multidimensional array object, said flags being dynamically alterable at execution time to represent whether it is possible to optimize a process for elements of said multidimensional array object according to a current execution state of said process, said process being a defined set of instructions executable by said computer, executing a machine code performing said process, said machine code being selected from among a plurality of machine codes performing said process according to state of said flags; and inverting said flags when a predetermined condition is no longer met; wherein said predetermined condition is whether a base array of a multidimensional array object is allocated to consecutive memory areas; and wherein the machine code is either a machine code optimized or a machine code not optimized according to the predetermined condition.

9. The computer of claim 8, wherein said program further comprises:

determining whether said predetermined condition is met when writing to said multidimensional array object.

10. The computer of claim 8, wherein said program further comprises:

if said predetermined condition is met when generating said multidimensional array object, setting said flags to a generated multidimensional array object.

\* \* \* \* \*